2,547,237

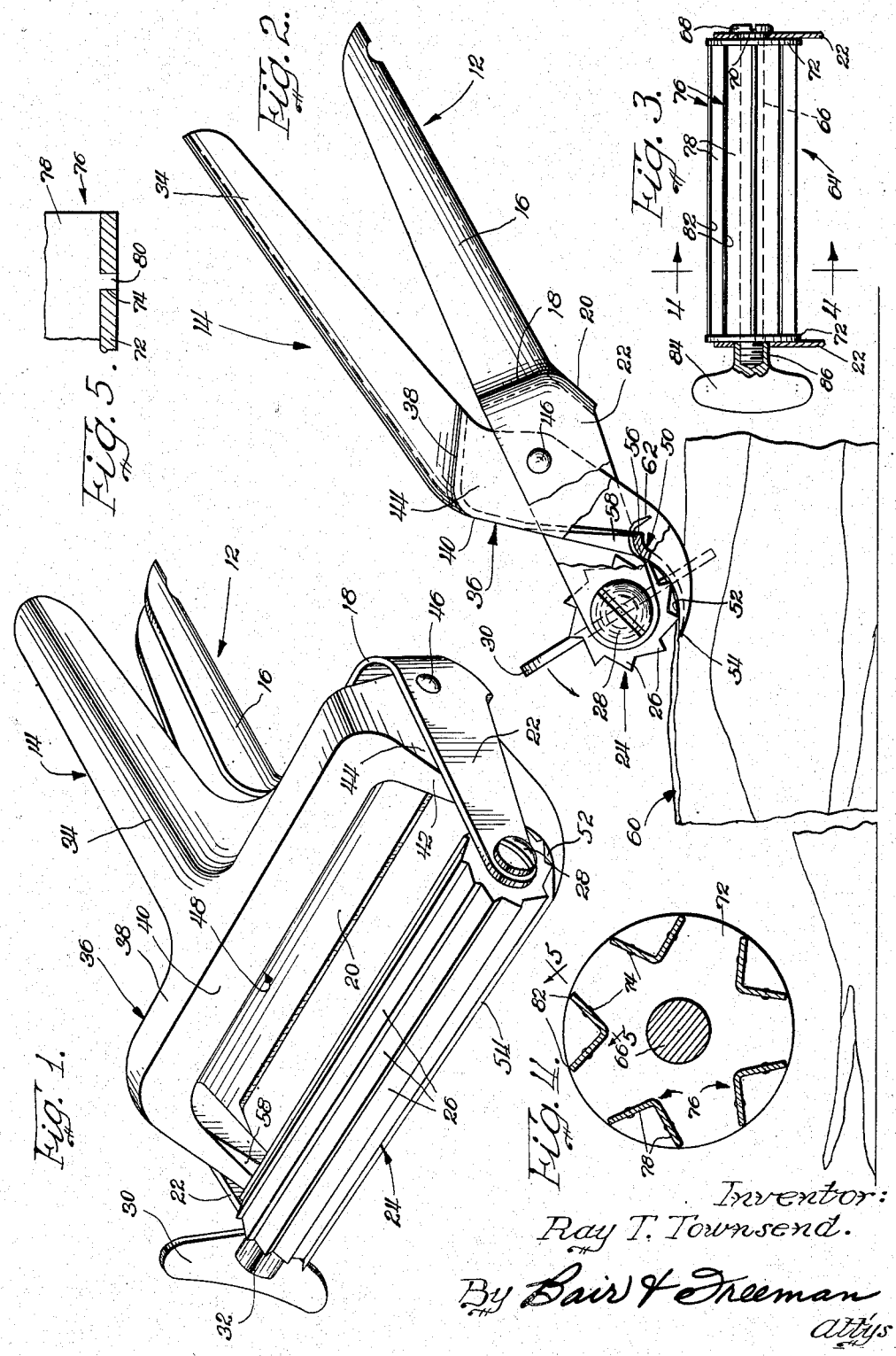
April 3, 1951  R. T. TOWNSEND  2,547,237
HAND FISH SKINNER
Filed Sept. 4, 1948
Inventor:
Ray T. Townsend.
By Bair & Freeman
Attys Patented Apr. 3, 1951

UNITED STATES PATENT OFFICE 2,547,237

HAND FISH SKINNER

Ray T. Townsend, Des Moines, Iowa, assignor to Townsend Engineering Company, Des Moines, Iowa, a corporation of Iowa Application September 4, 1948, Serial No. 47,883

4 Claims. (Cl. 17—7)

This invention relates to a device for skinning fish.

An object of the invention is the provision of a small and compact hand manipulated tool for skinning fish.

Another object of the invention is the provision of a small and compact hand manipulated tool having a toothed roller and a cooperating curved surface, which together form the means for removing skin from the fish.

Still another object of the invention is the provision of a device as referred to in the previous paragraph in which the curved surface has a knife edge extension effective for cutting the skin from the flesh. The curved edge cooperates with the skin pulling means for removing the skin.

Still another object is the provision of a small and compact tool of the "pliers" type in which there are pivoted a pair of swingable lever members, a roller being mounted on one of the lever members, and a pressure surface being provided on the other lever member.

A further object of the invention is the provision of a hand tool of the type referred to above in which the main portions are made of stampings, resulting in an economical article.

With these and other objects in view, my invention consists in the construction, arrangement and combination of the various parts of my skinning device whereby the objects contemplated are attained, as hereinafter more fully set forth, pointed out in my claims and illustrated in the accompanying drawings, wherein:

Figure 1 is a perspective view of the device of the present invention;

Figure 2 is a side view showing the device in the operation of skinning the fish, parts of the device being broken away;

Figure 3 illustrates an alternate form of roller to be used in the device;

Figure 4 is a sectional view taken on line 4—4 of Figure 3; and

Figure 5 is a view taken on line 5—5 of Figure 4.

Referring in detail to the drawings, the tool as a whole comprises a pair of lever members 12 and 14 making up the main portion of the device, as will be referred to later. The lever members are both made of stampings. The lever member 12 includes a handle portion 16, which is U-shape in cross section, with the lower closed end being disposed for bearing on the hand of the user. The handle portion 16 merges into a transverse portion 18, which in general is in a form of a vertically disposed flange having a forwardly extending portion 20. Extending forwardly from the outer ends of the transverse portion 18 is a pair of arms 22 disposed at substantially right angles to the portion 18 and disposed vertically with their flat faces directed toward each other.

Mounted in the outer end of the arms 22 is a skinning roller 24. The roller 24 has a main portion provided with a plurality of axially extending peripheral teeth 26. The roller 24 includes a shaft 28 which may be formed integral with the roller or formed separately and secured in the roller for rotation therewith. One end of the shaft 28 is rotatably mounted in one arm 22, as illustrated in the Figures 1 and 2, and it may be provided with an enlarged outer end which bears on the outer surface of the arm 22 for securing the roller in place. The opposite end of the shaft 28 is rotatably mounted in the other arm 22 and extends therebeyond where an actuating key 30 is secured thereto. The key 30 has a hub portion 32 directly secured to the end of the shaft 28 outwardly of the adjacent arm 22, so that upon rotation of the key 30 the roller is rotated.

The lever member 14 includes a handle member 34 similar to the handle member 16 which is also U shape in cross section. As illustrated in the drawings, when the lever members are secured together, the respective handle portions are in cooperating positions. At the forward end of the handle member 14 is what is termed for convenience, a wide-spread area 36 extending transversely across the handle portion. The widespread area 36 includes a flange 38 and another flange 40 forming a portion of the top general area of the wide-spread portion. Extending forwardly from the portions 38 and 40 are arms having portions 44 disposed at an angle thereto and at an angle to the transverse portion. The surfaces 44 form down turned flanges and form the means by which the two lever members are pivoted together. The flanges 44 fit on the inner surfaces of the arms 22 where they are pivotally secured together by means of rivets 46.

The wide-spread portion 36 includes a center opening 48 which is defined at its front edge by a transverse piece 50 extending between and formed integral with the side portions 42 and 44. The transverse piece 50 may also be termed a pressure shoe and includes a curved pressure surface 52 adapted to come into engagement with the roller 24 when the lever members are pivoted and swung together into the positions shown in the Figures 1 and 2 of the drawings. The front edge of the pressure surface 52 is provided with a knife edge 54 which extends slightly beyond the periphery of the roller 24, substantially tangentially thereto.

The rear edge of the transverse piece 50 is curved rearwardly as shown at 56 in a direction opposite to the curvature of the pressure surface 52, or away from the roller 24. At the ends of the curved portion 56 are portions 58 which form the inner edges of the flat portions 42. The portions 58 are of course formed integral with the remainder of the lever member and are angled slightly with respect to the curved edge 56.

A slab of fish is indicated at 60. In the use of the device the operator spreads the handle portions and thereby the pressure surfaces 52 and the roller 24 are separated. The knife edge 54 is inserted under the skin, which may be done at one end, e. g. the right end of Figure 2 where a portion of the slab is cut off and the end of the skin is exposed. The knife edge need be inserted only a slight distance under the skin and then the handle portions are gripped by the user. He then rotates the key 30 in the direction indicated by the arrow. The roller being thus rotated grips the skin between itself and the pressure surface, whereupon rotation of the roller pulls the skin, a severed portion of which is indicated at 62. The knife edge performs a severing operation and the roller furnishes the means whereby both the skinning and pulling operations are accomplished.

It is not necessary that the knife edge be inserted under the skin at an exposed end, for it may be inserted through an unbroken portion of the surface of the skin.

Figures 3, 4 and 5 illustrate a novel type of roller which can be made substantially completely of stamped pieces. The roller itself is indicated generally by the reference numeral 64 and includes a shaft 66 which may be in the form of a bolt. At one end of the bolt is a head 68 next to which is a reduced portion 70 forming a shoulder. Both the head and shoulder are larger than the main portion of the shaft. Mounted on the shaft 66 adjacent each end thereof is an end plate 72. Each end plate 72 is provided with a series of circumferentially spaced holes 74 (Figure 4). The holes in the two end plates are in respective alignment axially.

A plurality of blade elements 76 are incorporated in the roller and each blade element is V-shape in cross section forming arms 78 disposed at an angle with respect to each other. At each end of each arm 78 is a lug 80 extending axially of the arm. The blade elements are incorporated in the roller by inserting the lugs 80 into the respective holes 74 in such manner that the terminal edges of the arms are disposed around the roller in the surface of a cylinder and in the present instance may be substantially coincident with the periphery of the end plates. The terminal edges of the arms 78 form teeth indicated at 82. The blade members 76 are so constructed and arranged that the edges forming the teeth 82 are spaced substantially equally around the roller, i. e. the space between the teeth of each blade member is the same as the space between the teeth of the adjacent arms of adjacent blade members.

After inserting the blade members in the end plates as described above the thumb nut 84 having a hub portion 86 is threaded on the shaft 66 with the hub portion in engagement with the adjacent end plate 72. The shaft 66 is rotatably mounted in the arms 22. The head 68 of the shaft and the thumb nut 84 retain the arms 22 and thereby retain the roller in the arms. The thumb nut 84 cooperates with the shoulder formed by the reduced portion 70 in locking the end plates together and the blade elements 76 therebetween. The end plates are thus held by friction to rotate with the shaft.

It will be seen from the foregoing that a simple and rugged device is accomplished, as well as an economical device. The lever members 12 and 14, including the arm portions thereof, are formed as stampings, in the case of the device of Figures 1 and 2, and the roller 24 and its shaft and key are simply attached to the stampings.

Substantially all of the roller illustrated in Figures 3, 4 and 5, is made of stampings and as a result the whole device can be substantially entirely made of stampings. The roller formed according to the illustrations in Figures 3, 4 and 5 produces an effective means for performing the skinning operation.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A hand manipulated skinning tool of the pliers type, comprising, a pair of lever members pivoted together, said lever members having cooperating handle portions, one lever member having a toothed roller rotatably mounted therein, the other lever member having a curved pressure surface formed thereon, said pressure surface being adapted to engage and partially surround said roller on swinging said lever members toward each other, and an actuating element secured to said roller at one end thereof beyond said lever members for rotating said roller by one hand while the other hand is used to squeeze said levers for engaging said pressure surface with the inner surface of a skin while said toothed roller engages the outer surface thereof and propels the skin past said pressure surface as said roller is rotated.

2. A hand tool of the pliers type for skinning fish or the like, comprising, a pair of lever members formed as stampings, one lever member having a handle portion at one end and laterally spaced arms at the other end, said arms having flat faces spaced from each other, a toothed roller between said flat faces and rotatably mounted in the ends of said arms, a hand engageable actuating element secured to said roller at one end thereof for rotating the roller, the other lever member having a handle portion at one end and a wide spread portion at the other end, said wide spread portion having downturned flanges pivoted to said arms of said one lever member for pivoting the lever members together with the handle portions in positions to be moved toward each other when said handle portions are gripped in one hand and the other hand is used to engage and rotate said actuating element, said wide spread portion having an opening defined on one edge by a transverse piece opposite the handle portion, said transverse piece having a curved pressure surface adapted to engage and partially surround said roller, the inner edge of said transverse piece being curved oppositely to said pressure surface, and said outer edge of said transverse piece being reduced to substantially a knife edge and extending substantially tangentially beyond the periphery of said roller.

3. In a device of the character described, a pair of lever members pivoted together, said lever members having cooperating handle portions at one end, a shaft rotatably mounted in one lever member opposite the handle portion thereon, a pair of axially spaced perforated end plates on said shaft for rotation therewith, a plurality of blade elements removably secured to and between said end plates and spaced circumferentially therearound, each blade element being V-shape in cross section having arms with their terminal edges directed outwardly and disposed in a cylindrical surface, projections on the end of each arm entering the perforations of said end plates for locating said blade elements radially relative thereto and mounting each one against rotation relative to said end plates, means for rotating said shaft, said shaft, end plates and blade elements forming a roller, and a pressure shoe on the other lever member, said pressure shoe being adapted to engage said terminal edges of said blade elements upon gripping said handle portions and thereby swinging said lever members.

4. In a hand manipulated tool of the character disclosed, a member having a handle element, a pressure shoe mounted on one end of said member, said pressure shoe having a curved surface and a marginal edge sharpened to substantially a knife edge, supporting means pivotally mounted on said member, a toothed roller mounted on said supporting means and a wing operatively connected with said roller, said roller being movable toward and from said curved surface of said pressure shoe by relative pivotal movement of said member and said supporting means, said roller being engageable with said curved surface, said curved surface following the curvature of said roller and partially surrounding said roller, said roller, wing and curved surface together forming a skin pulling means, and said knife edge forming a skin severing element in conjunction with said skin pulling means.

RAY T. TOWNSEND.

REFERENCES CITED

The following references are of record in the file of this patent:

UNITED STATES PATENTS

| Number | Name | Date |
|---|---|---|
| 678,591 | Simon | July 16, 1901 |
| 1,261,202 | Barghausen | Apr. 2, 1918 |
| 1,703,217 | Watson | Feb. 26, 1929 |
| 2,437,971 | Russell | Mar. 16, 1948 |
| 2,455,831 | Townsend | Dec. 7, 1948 |